United States Patent [19]

Sundermeyer et al.

[11] Patent Number: 4,950,373
[45] Date of Patent: Aug. 21, 1990

[54] PROCESS FOR THE PRODUCTION OF DISILANE FROM MONOSILANE

[75] Inventors: Wolfgang Sundermeyer, Neckargemüend; Michael Mueller, Heidelberg; Hans-Juergen Klockner, Hanau, all of Fed. Rep. of Germany

[73] Assignee: Degussa Aktiengesellschaft, Frankfurt am Main, Fed. Rep. of Germany

[21] Appl. No.: 377,758

[22] Filed: Jul. 11, 1989

Related U.S. Application Data

[63] Continuation of Ser. No. 118,140, Nov. 9, 1987, abandoned.

[30] Foreign Application Priority Data

Nov. 15, 1986 [DE] Fed. Rep. of Germany ....... 3639202

[51] Int. Cl.[5] .......................... H05F 3/00; C01B 33/04
[52] U.S. Cl. ...................................... 204/164; 423/347
[58] Field of Search .......................... 423/347; 204/164

[56] References Cited

U.S. PATENT DOCUMENTS 4,064,521 12/1977 Carlson .................................. 65/134
4,568,437 2/1986 Dickson ............................... 204/164
4,604,274 8/1986 Zavelovich et al. ............ 204/157.41

FOREIGN PATENT DOCUMENTS 1106411 5/1986 Japan .

OTHER PUBLICATIONS

Synthesis of the Higher Silanes and Germanes, Gokhale et al, 2/19/65.
Spanier, E. J. et al., "The Conversion of Silane to Higher Silanes in a Silent Electric Discharge", Inorganic Chem. 1, (1962), pp. 432–433.
Brodsky, M. H. et al., "Infrared and Raman Spectra of the Silicon-Hydrogen Bonds in Amorphous Silicon Prepared by Glow Discharge and Sputtering", Phys Rev 16B, (1977), pp. 3556–3557.
Kirk-Othmer Encyclopedia of Chemical Technology, 3rd Edition (1981), vol. 16, pp. 692–695 and Supplement, vol. pp. 600, 602 and 615–616.

Primary Examiner—Robert L. Stoll
Assistant Examiner—Lori F. Cuomo
Attorney, Agent, or Firm—Beveridge, DeGrandi & Weilacher

[57] ABSTRACT

A process for the production of disilane from monosilane, in which a gaseous mixture of monosilane and hydrogen is subjected to a plasma discharge.

8 Claims, 1 Drawing Sheet

PROCESS FOR THE PRODUCTION OF DISILANE FROM MONOSILANE

This is a continuation of application Ser. No. 07/118,140 filed Nov. 9, 1987 now abandoned.

INTRODUCTION AND BACKGROUND

The present invention relates to the production of disilane from monosilane by means of plasma discharge.

A plasma represents a partially or entirely ionized gas, in which positive, negative and neutral molecules exist in close proximity to each other in an overall neutral environment.

The fact that electric discharges, with which non-equilibrium plasmas are produced, are suitable for the production of higher silanes starting from monosilane was first demonstrated by E. J. Spanier and A. G. MacDiarmid (Inorg. Chem. 1 (1962) 432/3. The ozonizer (ozone producer) used by Spanier et al. supplies a 63% yield of a mixture of 66% $Si_2H_6$, 23% $Si_3H_8$ and 11% higher silanes, while the remaining 37% is deposited in the form of an amorphous layer on the inside walls of the ozonizer.

Production of disilane from monosilane with the help of the silent electric discharge at atmospheric pressure and/or higher pressure is disclosed in Japanese patent specification 60/127 214 (C. A. 1986, 104:7722 m).

RF-discharges (high frequency luminous discharges) are indicated by Dickson (U.S. Pat. No. 4,568,437) for the production of disilane with a yield of approximately 40%, based on the reacted monosilane. A pressure of 1 to 2 torr and a temperature of 120° to 300° C. are used in this process.

However, here too the formation of an undesirable amorphous silicon layer on the walls of the reaction vessel cannot be avoided, which therefore requires further research.

European patent application 0 143 701 relates to the deposition of amorphous silicon layers by thermal decomposition of disilane. According to the process described in this specification, this compound is obtained by reaction of monosilane with atomic hydrogen, which is produced outside the reaction zone by microwave discharge in a hydrogen atmosphere.

Precise parameters of the process such as for instance the amount of charge fed in and the hydrogen concentration and/or a disilane yield however are not disclosed.

SUMMARY OF THE INVENTION

It is an object of the present invention to provide a process for the production of disilane ($Si_2H_6$) from monosilane ($SiH_4$), which is conducted with great selectivity and in which the formation of an amorphous silicon layer is avoided for the most part.

In attaining the above and other objects, one feature of the present invention resides in subjecting a mixture of hydrogen and monosilane to plasma discharge.

It is advantageous in accordance with the invention to use a mixture consisting of 70 to 98% by volume, especially 90 to 95% by volume hydrogen, and 2 to 30% by volume, especially 5 to 10% by volume monosilane.

BRIEF DESCRIPTION OF THE DRAWINGS

The present invention will be further understood with reference to the drawings wherein.

DETAILED DESCRIPTION OF THE INVENTION

Figure 1:
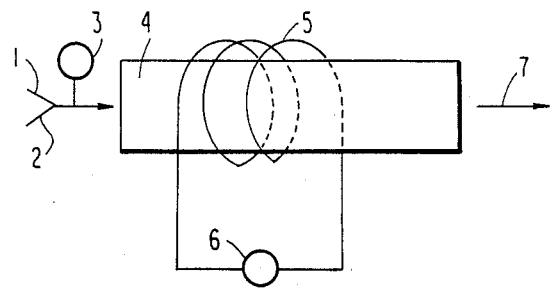
FIG. 1 is a schematic representation of the process flow diagram in accordance with a discontinuous method of operation of the present invention.

According to one embodiment of the invention, there is provided a discontinuous or batch mode of carrying out the process of the invention. This is illustrated in FIG. 1.

Hydrogen and/or monosilane in gaseous form are introduced through charging lines (1) and (2), in which the uniformity of flow is monitored and controlled with the aid of gas flow regulators (not shown). The gas flow regulators are conventional. At the point where charging lines (1) and (2) meet, the gases mix with each other. The gaseous mixture flows into the reaction tube zone (4) under constant pressure as determined by control means (3). The reaction zone is formed of a tube that can be glass or quartz. A coil (5) formed of a plurality of loops connected with the plasma generator (6) and working as resonant or oscillating circuit surrounds the reaction tube. The product mixture stream (7) is discharged from the reaction zone. The composition of the product stress can be analyzed by any suitable means, such as by gas chromatography using part of the product stream.

Figure 2:
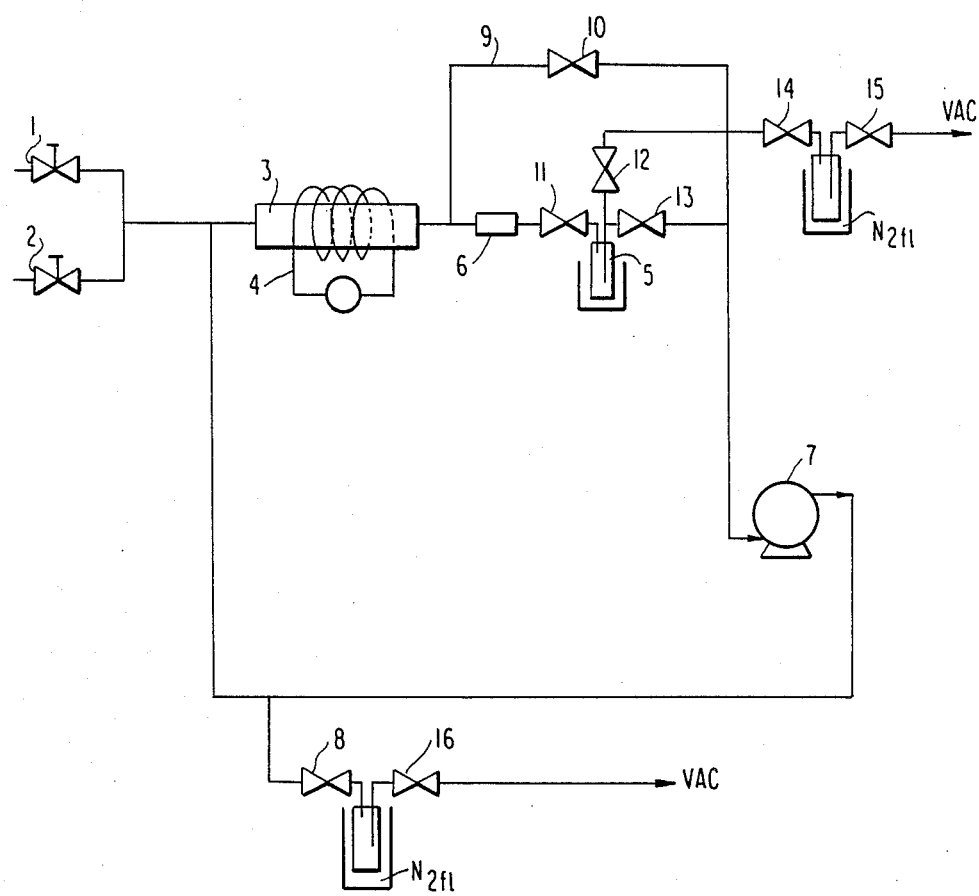
FIG. 2 is a schematic representation of the process flow diagram in accordance with a continuous mode of operation of the present invention.

FIG. 2 shows the flow diagram for the cyclically (continuously) operating apparatus in accordance with a second embodiment of the present invention. Hydrogen and/or monosilane gas are introduced into a common conduit means from separate charging means through conventional flow regulators (1) and (2). The gaseous mixture formed in the common conduit means flows into the glass or quartz reaction tube zone (3). Constant pressure regulation is achieved by means of a vacuum pressure line (VAC). A coil (4) generally formed of a plurality of loops, serving as resonant or oscillating circuit and connected with the plasma generator, surrounds the reaction zone tube. The reaction product mixture is conducted through the coil and through a filter (6) into a cold trap (5) which is cooled with isopentane and liquid nitrogen. Disilane and higher silanes are here separated by condensation freezing, while the unreacted silane runs through the cold trap and is recycled through a diaphragm pump (7) back into the process circuit. The sidestream in which the gas chromatography of the reaction takes place continuously is not shown. The excess hydrogen is removed through (8). Valves 10 to 16 regulate flow.

Both gases are especially thoroughly mixed with each other before the reaction zone, which is practically identical with the discharge zone.

At frequencies above 0.5 MHz, direct contact between electrodes and plasma is no longer required and the energy can be transferred by electrodes lying outside the reaction vessel.

The electrodes in this case form a capacitor with the plasma as dielectric (capacitive excitation).

If the reaction vessel lies in the axis of a resonant or oscillating circuit, for instance a copper coil, then the energy can also be transferred inductively to the plasma.

For purposes of the invention, it is preferable to use frequencies of 0.5 to 150 MHz, especially from 5 to 50 MHz.

Between 0.01 and 1 Watt/cm$^3$ of power is fed in, preferably between 0.05 and 0.4 W/cm$^3$ and therefore well below the required optimum power charge according to U.S. Pat. No. 4,568,437. (The volume data is collected from the reaction zone.) High frequency luminous discharges, as are used according to the invention, presuppose a vacuum pressure in the discharge zone.

It has been discovered to be advantageous to work with the conversion of monosilane into disilane in a pressure range of from $1 \cdot 10^2$ to $5 \cdot 10^3$ Pa, preferably from $1 \cdot 10^2$ to $3 \cdot 10^3$ Pa.

The gaseous mixture stays in the reaction zone for less than 30 seconds, preferably between 0.01 and 25 seconds, preferably between 1 and 25 seconds, based on the mixture in standard conditions.

The throughput units (Nl/h) of the reaction mixture are to be adjusted corresponding to the dwell time range which is considered to be optimum.

In carrying out the invention, the reaction tube is heated up to 300° C., especially to 40° to 200° C. In one preferred embodiment, the special additional heating is not employed, and the reaction is left to run at the temperature which is established during the discharge process in the reaction zone, which approximates 40 to 60° C.

It has been determined that with increasing power input, the disilane volume grows to a limiting value. After passing through the maximum point, the volume of disilane which is produced drops once again.

An improved yield in the upper part of the pressure range is obtained with the so-called "pulsed" operation of the RF-generator. This method of operation also allows for a higher bulk flow rate.

Under these operational conditions, the plasma is ignited for only a short time.

Following a certain time which can be selected within a wide range of time periods, for example, from 1 to 100 milli-seconds, the energy feed is interrupted and the plasma is subsequently ignited again, for example, after 1 to 40 milli-seconds. An interposed wattmeter shows the average power charge delivered over a certain time.

For example, if the input is 45 W for a time period of 3.3 milli-seconds, and then the RF generator is disconnected for 33 milli-seconds, that corresponds to an average power charge of approximately 4 Watts.

The preferred average power input in the pulsed operation ranges between 0.01 and 1 W/cm$^3$, especially between 0.05 and 0.4 W/cm$^3$, in which power input in brief spurts is between 0.5 and 4 W/cm$^3$.

It is desirable, after the reaction, to remove disilane and the by-product trisilane from the reaction mixture by freezing concentration and to continuously meter monosilane with a gas flow regulator corresponding to the volume which is used, in order to thus produce higher conversions in continuous operation.

| Test No. | Examples | | |
|---|---|---|---|
| | 1 | 2 | 3 |
| Power charge (a) (W/cm$^3$) of the | 0.21 | 0.23 | average chg. 0.11 W/cm$^3$ peak charge 1.2 W/cm$^3$ |
| RF generator (b) (W) | 15 | 16 | average charge 4 W peak charge 45 W |
| SiH$_4$ (N l/h) | 0.6 | 3.8 | length of pulse 3.3. msec |
| H$_2$ (N l/h) | 11.8 | 11.8 | pulse interval 33.0 msec |

| Test No. | Examples | | |
|---|---|---|---|
| | 1 | 2 | 3 |
| Mixture ratio % SiH$_4$ in H$_2$ | 5 | 15.2 | 10 |
| Pressure (Pa 10$^2$) | 2.7 | 1.6 | 12.5 |
| Residence time (sec) | 0.05 | 0.03 | 2 |
| Yield (of reaction) | | | |
| Si$_2$H$_6$ | 85.0 | 86.6 | 77.5 |
| Si$_3$H$_8$ | 15.0 | 10.0 | 11.2 |
| Loss | 0 | 3.4 | 11.3 |

Examples 1 and 2 were carried out using a batch apparatus represented by FIG. 1. The reaction zone was heated to approximately 40° -60° C. during the discharge process. A loss in the form of a solid separation deposition on the inside wall of the reaction tube (diameter 3 cm) was observed on a small portion of the periphery only in Example 2.

Example 3 was carried out using a continuous apparatus represented by FIG. 2. The converted silane was metered in a controlled manner, so that a mixture with a portion of 10% by volume SiH$_4$ flowed continuously into the reaction zone. The example was carried out for 4 hours. The extent of reaction amounted to 53.8%, based on the silane which was used.

Further variations and modifications of the invention will be apparent to those skilled from the foregoing description and are intended to be encompassed by the claims appended hereto.

We claim:

1. A process for the production of disilane from monosilane by means of plasma discharge, operated in a discontinuous mode comprising providing a mixture consisting of hydrogen and 2 to 30% by volume monosilane gas, conducting said mixture in a constant pressure range from $1 \cdot 10^2$ to $5 \cdot 10^3$ Pa through a reaction zone comprising a reaction vessel, said reaction zone being provided with high frequency luminous discharge as plasma discharge means wherein frequencies of 0.5 to 150 MHz are used and the residence time of the mixture in the reaction zone is between 0.01 and 25 seconds, introducing between 0.01 and 1 Watt/cm$^3$ of power input to said reaction zone to convert the monosilane to disilane, with little or no formation of an amorphous silicon layer on the inside wall of the reaction vessel, and thereby obtain a disilane product stream and recovering the disilane.

2. The process according to claim 1, wherein the mixture is 90% to 95% by volume hydrogen and 5 to 10 by volume monosilane.

3. The process according to claim 1, wherein the temperature in the reaction zone is approximately 40° to 60° C.

4. A process for the production of disilane from monosilane by means of plasma discharge operated in a continuous mode comprising providing a mixture consisting of hydrogen and 2 to 30% by volume monosilane gas, continuously conducting said mixture in a constant pressure range from $1 \cdot 10^2$ to $5 \cdot 10^3$ Pa through a reaction zone comprising a reaction vessel, said reaction zone being provided with high frequency luminous discharge as plasma discharge means wherein frequencies of 0.5 to 150 MHz are used and the residence time of the mixture in the reaction zone is between 0.01 and 25 seconds, introducing a power input to said reaction zone ranging from 0.5 to 4 Watts/cm$^3$ in pulses resulting in an overall average charge of 0.01 to 1 W/cm$^3$ to convert the monosilane to disilane, with little or no formation of an amorphous silicon layer on the inside wall of the reaction vessel, and thereby obtain a disilane product stream and recovering the disilane, wherein the reaction product is concentrated by freezing, and the resulting mixture is adjusted relative to the output concentrations of unreacted monosilane so as to correspond to the volume % and is again conducted through the reaction zone.

5. The process according to claim 4, wherein the mixture consists of hydrogen and 5 to 10% by volume monosilane.

6. A process as claimed in claim 4, wherein the pressure range is from $1 \cdot 10^2$ to $3 \cdot 10^3$ Pa.

7. A process as claimed in claim 4, wherein the pulsed operation results in an overall average charge of 0.05 to 0.4 W/cm$^3$.

8. A process as claimed in claim 4, wherein frequencies of from 5 to 50 MHz are used.

* * * * *